April 9, 1963     E. SCHLUETER     3,084,954
TRAILER DRAWBAR HITCH
Filed June 27, 1961
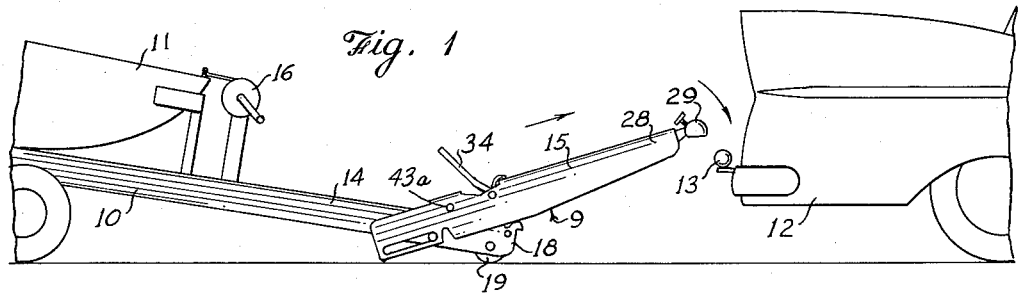
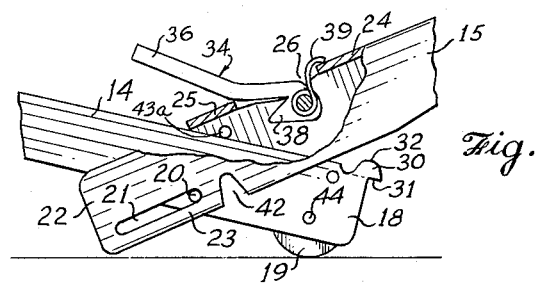
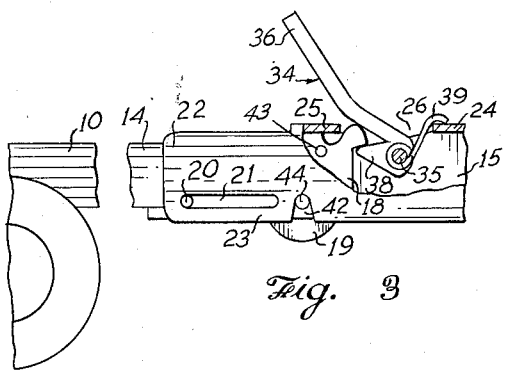
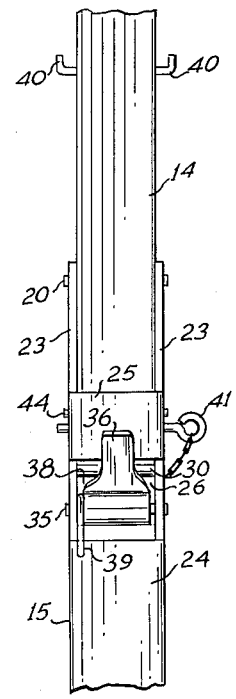
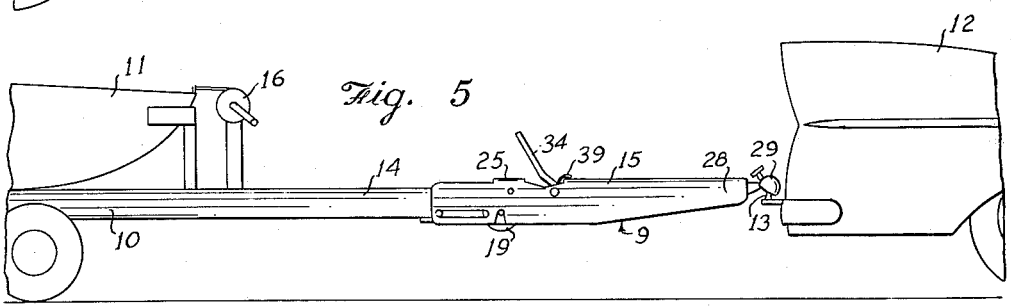
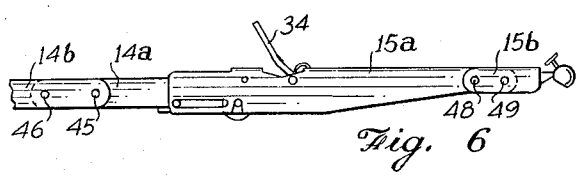
INVENTOR.
Ernest Schlueter
BY
AGENT United States Patent Office 3,084,954
Patented Apr. 9, 1963

3,084,954
TRAILER DRAWBAR HITCH
Ernest Schlueter, 74 Edwards Road, Troy, N.Y.
Filed June 27, 1961, Ser. No. 120,025
4 Claims. (Cl. 280—476)

This invention relates to hitches, drawbars, tongues and booms and the like for trailer vehicles which are drawn by a leading self powered vehicle or tractor.

More particularly the invention relates to drawbars for comparatively light-weight trailers of simple design and which must be more or less frequently attached to a pulling vehicle such as an ordinary passenger automobile or a farm tractor.

While devices of this general nature have been well known for a long period of time, there are many situations in which drawbars of the prior art are not satisfactory.

Many of the shortcomings of the prior art are due to the fact that drawbars are not suitable for convenient manipulation by only one person, who must also drive the tow vehicle, unless they are provided with accessories such as jacks, drawscrews and the like to take care of the weight of the drawbar and part of the trailer.

An object of the invention is therefore to provide a drawbar or hitch which can be connected without difficulty to a tow vehicle.

Another object of the invention is to provide a drawbar having a part light in weight and which can be connected to a tow car despite necessary appreciable vertical and longitudinal movement of part, with some lateral movement, and yet automatically assume the characteristics and have the advantages of an integral drawbar or boom.

These and other apparent objects and advantages are attained in connection with a drawbar which, briefly stated, includes a boom and tow member, connected in loosely pivoted toggle fashion, and latch means so that when the two members are pulled into alinement they become locked against all relative movement.

In the accompanying drawing showing, by way of example, two of many possible embodiments of the invention, FIG. 1 is a side elevation of the drawbar in unlocking position ready for connection to a tow vehicle;

FIGS. 2 and 3 show details of the latch means in unlocked and locked positions of the drawbar;

FIG. 4 is a fragmental plan of the drawbar in locked position;

FIG. 5 is a side elevation of the drawbar locked for use, and

FIG. 6 shows a modification of the invention.

This invention is shown as an articular drawbar, generally designated 9, in connection with a trailer 10 for a boat 11 to be drawn by an automobile 12 fitted with a well known coupling ball 13 at the rear. The drawbar 9 is made up of a rear beam 14, shown in FIG. 1 as a structural part of the trailer, and a tow or forward member 15 to be attached to the coupling ball.

In frequent practice, the boat 11 is drawn upon the trailer by a winch 16 to a position far enough forward so that the trailer, if for instance a two-wheeled trailer, tends to tip down forwardly as shown in FIG. 1. The forward end 18 of the beam 14 is provided with a wheel or roller 19 to support the end 18 from the ground when the trailer is tipped.

The tow member 15 is generally of inverted channel shape, hinged to the beam, but with provision for longitudinal telescoping motion loss, so as to form somewhat of a loose toggle joint, which may be locked in substantially straight and extended position.

Near the forward end of beam 14 there is provided a fixed transverse pin 20 projecting from each side of the beam to carry the tow member. The pin projects into longitudinal parallel slots 21 in the lower zone of the rear portions 22 of respective flanges 23 of the tow member. The web 24 is removed at this rear portion and is also provided with a cut out window 26 slightly forward to leave a cross part 25. The pin is slidable in the slots to provide for the mentioned telescoping action and serves as the pivotal connection between the drawbar beam 14 and the tow member so that when the beam is tipped forward the tow member may be raised or lowered at its forward end 28, and may be moved forward and backward within the limits of the slots 21. The tow member is light in weight and can normally be moved up and down, back and forth by one person since at least half the drawbar, to say nothing of the trailer proper, is supported independently of the tow member.

With the drawbar in a position as in FIG. 1, a person can uphold the forward end portion 28 and move the tow member forward to enable the clamp 29 to be coupled to the ball 13 in a conventional manner. While lateral play about the pivoted joint is generally not desirable when the drawbar is in use, there is usually sufficient play to permit easy alinement for coupling, for alinement in lateral directions generally presents no problem. However if the beam be shallow relative to the length of the overlap of the tow member on the beam, there can be appreciably greater lateral play with drawbar in FIG. 1 position than in FIG. 5 position for a given construction.

The forward end 18 of the beam is provided with a dog or keeper 30 at its upper part, the keeper having an undercut face 31 about in a lateral plane parallel with the longitudinal axis of the beam. The upper surface of the keeper is rounded as at 32.

The keeper 30 cooperates with a latch 34 transversely pivoted on the tow member between the flanges as at 35 and has a handle 36 projecting upwardly through the window 26. The latch has a hook 38 generally directed rearwardly to engage with the keeper 30 at the under face 31 while a part of the handle 34 engages on the round surface 32 to hold the beam 14 and the tow member 15 in extended position as shown in FIG. 3. A spring 39 tends to turn the latch counter clockwise until the handle strikes the web part 25. The keeper and hook are so shaped that when the cross pin 20 is rearmost in the slots 21, straightening of the toggle is attended by an automatic latching in straight position.

The latch is unhooked by turning the handle clockwise so that the hook slightly lifts the keeper relative to the tow member and then cams off the under face 31.

In operation, the boat is loaded on the trailer in the usual manner. The trailer may be drawn into a convenient location, if desired, by a safety chain (not shown) attached to some convenient part of the drawbar such as lugs 40 (or the coupler clamp 29) and to the ball 13. This can insure lateral alinement of the drawbar and the ball though the clamp 29 may be some few feet behind the ball. The automobile can then be backed in a straight line, with the tow member as in FIG. 1 or lying on the ground, until the ball is, say, a few inches from the position necessary for the clamp 29 to be engaged on the ball in a conventional manner. Due to the lost motion linkage by the pin 20 in the slots 21, the tow member 15 can be moved longitudinally and vertically with respect to the grounded beam and connected onto the ball 13 with little effort while the trailer, beam, and automobile are stationary.

After the tow member is connected, the automobile is then given a quick forward motion, or given slow motion with the wheels of the trailer scotched, or as sometimes best, run in reverse a few feet to give the trailer backward momentum and then with a sudden change to forward motion of the automobile.

Whatever operation is used, there is straightening of the toggle with enough force to get the keeper 30 past the spring latch hook 38 so that the drawbar is automatically latched in approximately straight position as shown in FIGS. 3 and 5 with the wheel 19 clear from the ground. A removable safety pin 41 through registering holes 43 and 43a in the beam and tow member respectively to relieve dependency on the latch may be provided. The respective flanges 23 of the tow member are provided with downwardly and slightly rearwardly open slots 42 to receive end portions of a transverse axle 44 carrying the wheel 19. With the axle in the slots little telescoping of the beam into the tow member is permitted when the automobile is slowed, and the telescoping which may take place drives the axle further up into the slots 42, against gravity.

The axle also acts as a stop to prevent buckling up of the joint, as may the web part 25.

While the invention is illustrated in FIGS. 1 to 5 with a substantially stiff or integral beam and tow member which are usually quite satisfactory, the invention is not so limited. For example the beam as well as the tow member may be linked pivotally and locked in position. FIG. 6 shows a beam 14a with a portion 14b pivoted thereto as at 45 and locked with a removable locking pin 46. Similarly the tow member carries a forward end portion 15b pivoted at 48 and locked at 49. Pivoted beams may be necessary for four wheeled trailers or farm machinery drawn by tractors.

In general it is not desirable to try to pull the latch joint straight with the pivoting unlocked at both 46 and 49, and it is often possible to get both pivotings locked before pulling the latch joint straight.

To disconnect the drawbar, the handle 36 is turned clockwise to unlatch. If the safety pin should bind it can be loosened by partial repeated turns of the latch since the unlatching movement lifts the hook 30 and forces relative movement of the beam and tow member.

The drawbar does not ordinarily fall to level ground during unlatching due to friction or braking of the trailer and automobile and consequently there is little danger to the operator. On uneven ground scotching may be required for the trailer. The operator may then move the automobile rearwardly several inches to drop the beam and give slack at the pin 20. Uncoupling then involves no more than freeing the slackened tow member.

The invention claimed is:

1. In a trailer hitch, a beam and a channel piece nested together at adjacent inner end portions, the channel piece having a web and side flanges, the inner end portion of the flanges being provided with longitudinal slots closed at their outer ends; a hinge pin transverse to the beam and having ends projecting therefrom into the slots, the inner end of the web being removed to permit pivoting of the piece on the beam; means for connecting each of the respective outer end portions of the beam and channel piece to respective vehicles; latch means on the two inner end portions for automatically locking the beam and piece against pivotal movement when they become substantially alined; said flanges having open end slots substantially at right angles to the longitudinal slots and said beam having detent projections received in the open end slots when the beam and piece are alined for preventing movement of the beam and piece longitudinally to each other.

2. In a trailer hitch as claimed in claim 1, said detent projections being ends of a shaft transverse to the beam, and a wheel on the shaft to support the beam.

3. In a trailer hitch as claimed in claim 1, said beam and channel piece being constrained to move in a substantially vertical plane, and provided with transverse holes registering when the detent projections are in their slots and the beam and piece are longitudinally alined, and a removable safety pin passing through the holes.

4. In a trailer hitch, a beam and a channel piece nested together at adjacent inner end portions, the channel piece having a web and side flanges, the inner end portion of the flanges being provided with longitudinal slots closed at their outer ends; a hinge pin transverse to the beam and having ends projecting therefrom into the slots, the inner end of the web being removed to permit pivoting of the piece on the beam; means for connecting each of the respective outer end portions of the beam and channel piece to respective vehicles; latch means on the two inner end portions for automatically locking the beam and piece against pivotal movement when they become substantially alined; said flanges having open end slots substantially at right angles to the longitudinal slots and said beam having detent projections received in the open end slots when the beam and piece are alined for preventing movement of the beam and piece longitudinally to each other, said beam and channel piece being constrained to move in a substantially vertical plane, and provided with transverse holes registering when the detent projections are in their slots and the beam and piece are longitudinally alined, and a removable safety pin passing through the holes, said latch comprising a keeper dog on the inner end of the beam and having an undercut surface generally parallel with the beam, and a latch hook having a part under the surface in engagement with the face in locking position to hold the inner end of the beam approximately alined with the piece, the hook being turnable to lift the dog slightly by camming on the surface to relieve force of the beam and piece on the safety pin to ease withdrawal of the safety pin.

References Cited in the file of this patent
UNITED STATES PATENTS

| | | |
|---|---|---|
| 1,485,509 | Kohler | Mar. 4, 1924 |
| 2,307,472 | Shuey | Jan. 5, 1943 |
| 2,491,333 | Ravers | Dec. 13, 1949 |
| 2,595,100 | Ravers | Apr. 29, 1952 |

FOREIGN PATENTS

| | | |
|---|---|---|
| 839,387 | Great Britain | June 29, 1960 |